Figure 1:
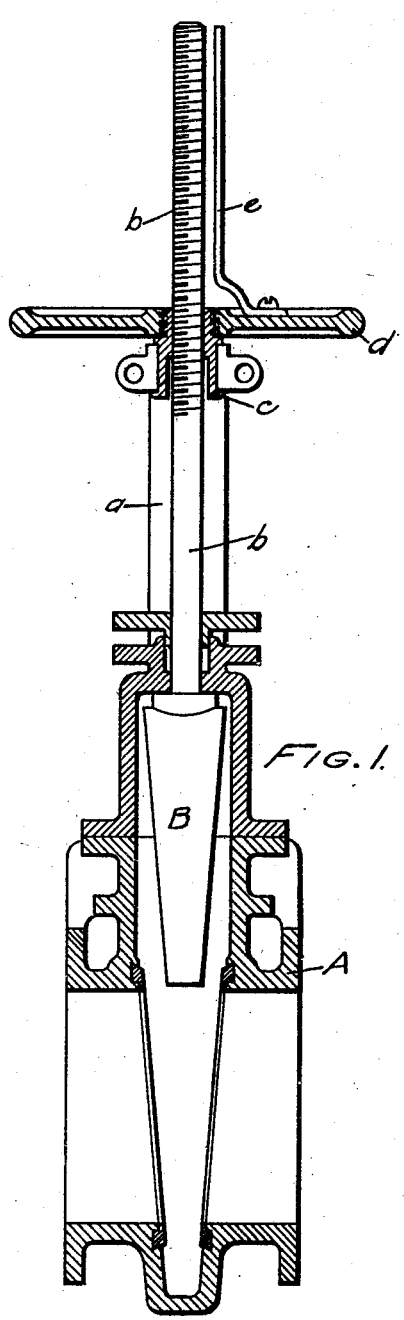

A. J. RICHMOND.
INDICATOR FOR GATE VALVES.
APPLICATION FILED JULY 9, 1902.

933,786.

Patented Sept. 14, 1909.

WITNESSES.
Catherine G. Bradley
James H. Thurston

INVENTOR
Arthur J. Richmond,
By Wilmarth H. Thurston
ATTY.

UNITED STATES PATENT OFFICE.

ARTHUR J. RICHMOND, OF BOSTON, MASSACHUSETTS, ASSIGNOR TO GENERAL FIRE EXTINGUISHER COMPANY, OF NEW YORK, N. Y., A CORPORATION OF NEW YORK.

INDICATOR FOR GATE-VALVES.

933,786. Specification of Letters Patent. Patented Sept. 14, 1909.

Application filed July 9, 1902. Serial No. 114,861.

*To all whom it may concern:*

Be it known that I, ARTHUR J. RICHMOND, of Boston, in the county of Suffolk and State of Massachusetts, have invented certain new and useful Improvements in Indicators for Gate-Valves; and I do hereby declare the following specification, taken in connection with the accompanying drawings, forming a part of the same, to be a full, clear, and exact description thereof.

The invention is especially adapted for use in connection with that type of gate valves which are provided with an outside screw and yoke. In one form of these outside screw and yoke valves the nut is secured to the hand wheel so as to be revolved thereby, the nut turning in the yoke, and the nut and hand wheel being held in the yoke against endwise movement, and the screw which is secured to the valve travels endwise through the nut and hand wheel. In another form of these valves the nut is rigid in the yoke and the hand wheel is secured to the screw, and the wheel and screw move together endwise. In both forms of valves the outer end of the screw is substantially flush with or close to the yoke when the valve is closed, and projects beyond the yoke when the valve is open a distance equal to the movement of the valve in opening. In the use of these gate valves in automatic sprinkler systems it is especially important to know whether the valve is closed or open, and also whether the valve is fully open or only partially so. While the amount of projection of the valve stem or screw beyond the yoke corresponds with the extent to which the valve is open, and while an experienced person familiar with valves of this kind could judge of the extent to which the valve was open by the amount of the projection of the valve stem, he would need to know the size or diamater of any given valve in order to judge whether the valve was fully open or not, and even then he could not be entirely certain about it without actually trying the valve or measuring the amount of projection of the valve stem, because there has not heretofore been anything in valves of this character by which to gage or indicate whether the valve stem projected to its full extent or not.

The object of the present invention is to provide a gage or indicator which will indicate or locate the position which the outer end of the valve stem should occupy when the valve is fully open, by means of which it can be readily seen upon inspection whether the valve is fully open or not, and to what extent the valve is open, and the invention consists in providing such an indicator which may be attached either to the hand wheel or to the yoke.

Figure 2:
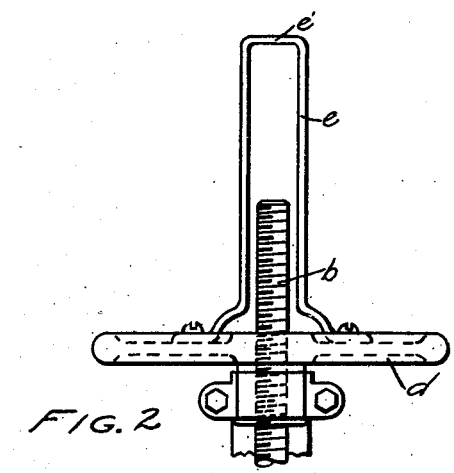
Figure 3:
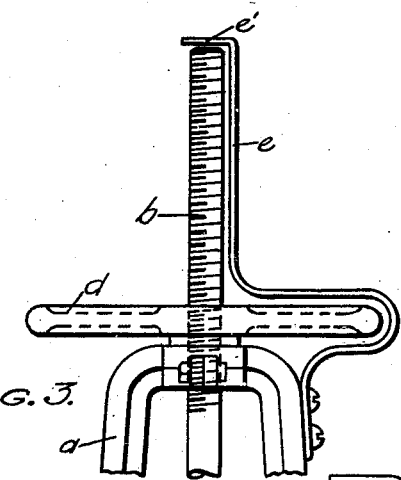
Figure 4:
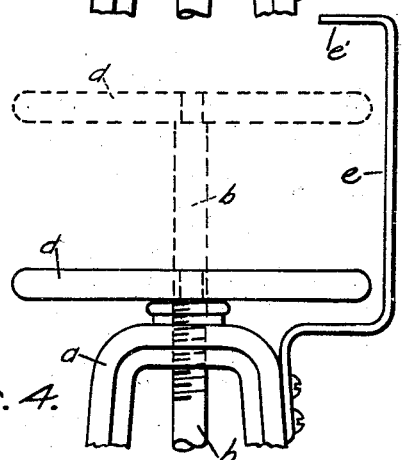

Referring to the drawings, Figure 1 is a vertical section of an outside screw and yoke gate valve of the form in which the nut is secured to the hand wheel, and in which the screw travels through the nut and wheel. Fig. 2 shows a modified form of the indicator. Fig. 3 shows another modification, in which the indicator is attached to the yoke. Fig. 4 shows the indicator attached to the yoke in that form of valve in which the nut is rigid with the yoke, and in which the hand wheel is secured to and travels with the valve screw.

Referring to Fig. 1, A represents the valve casing provided with the usual yoke *a*, and B the gate valve which is provided with the usual valve stem and screw *b*. *c* is the nut which is mounted to turn in the upper end of the yoke, and *d* is the hand wheel which in the construction shown in Fig. 1 is secured to the nut *c*. *e* is the indicator or gage, which in the form shown in Fig. 1 consists of a rod or standard secured to the hand wheel *d*. This indicator *e* is made of such length that its outer or free end will be in line with the outer end of the valve screw when the valve is fully open. By means of such indicator, therefore, even an inexperienced person may readily and accurately determine whether the valve is fully open or not, and if not fully open, to what extent it is open. If he sees that the end of the valve screw is in line with the end of the indicator he will at once know that the valve is fully open, but if the end of the screw is not in line with the end of the indicator he will know that the valve is not fully open, and will also know to what extent the valve is closed by gaging the distance from the end of the indicator to the end of the valve screw.

In the form shown in Fig. 2 the indicator is bail-shaped and is secured to the hand wheel so as to straddle the valve screw. In this form the cross piece *e'* will serve to further assist the eye in gaging or determining the position of the valve, as indicated by the position of the end of the valve screw.

In the form shown in Fig. 3 the indicator is secured to the yoke, and is so formed as to extend around the hand wheel without interfering with the operation thereof. The indicator shown in this figure is also provided with the transverse portion $e'$ which will be of assistance in gaging the position of the valve screw.

In the arrangement shown in Fig. 4 the nut is rigid with the yoke, and the hand wheel is secured to the screw and therefore travels therewith. In this arrangement the indicator $e$ is shaped so as to permit the movement of the hand wheel in opening the valve, and the indicator is also provided with the transverse portion $e'$ to assist in gaging the position of the hand wheel and thus the position of the valve.

What I claim as my invention and desire to secure by Letters Patent is:

1. The combination, with the valve screw of an outside screw and yoke valve, of an indicator, the end of which is arranged substantially in line with the end of the valve screw when the valve is fully opened, substantially as described.

2. The combination, with the valve screw of an outside screw and yoke valve, of a standard or gage-bar held against endwise movement, the end of which is arranged substantially in line with the end of the valve screw when the valve is fully opened, substantially as described.

3. The combination, with the valve screw of an outside screw and yoke valve, of a standard or gage-bar held against endwise movement, and having a transverse portion arranged at substantially right angles to the axis of the valve screw, said transverse portion overlying the end of said valve screw and in close proximity thereto when the valve is fully opened, substantially as described.

ARTHUR J. RICHMOND.

Witnesses:
W. C. VAN DERLIP,
A. E. BLISS.